United States Patent Office 3,493,747
Patented Feb. 3, 1970

3,493,747
PROCESS OF DEVELOPING A HEAT CREATED IMAGE IN DIAZOTYPE MATERIALS BY EXPOSURE TO GASEOUS ALKALI
Robert M. Gold, Brooklyn, N.Y., assignor to Keuffel & Esser Company, Hoboken, N.J., a corporation of New Jersey
No Drawing. Filed Nov. 16, 1964, Ser. No. 411,567
Int. Cl. G01m 23/04; G03c 1/52
U.S. Cl. 250—65                                5 Claims

ABSTRACT OF THE DISCLOSURE

Diazotype material consisting essentially of a composition of a diazonium compound and an azo dye coupler capable of forming a colored dye with said diazonium compound in an alkaline environment, and a support film of thermoplastic polymer may be used to form an image copy of opaque originals by imagewise heating. The diazotype material may be exposed to infrared radiation while in contact with an infrared absorbing original image to thermographically achieve an image temperature in the material between about the glass transition temperature of the polymer film and the decomposition temperature of the diazonium compound. Therefter, the heat-imaged diazotype material is exposed to an atmosphere of a gaseous alkali, such as ammonia vapor, and the typical azo dye forms in areas corresponding to the original image. The described heating of the material apparently creates corresponding areas of increased receptivity for developing vapors and thereby allows development of azo dye images in such heated-imaged areas at vapor concentrations which will not effectively develop a dye in the untreated material, i.e. the areas of the material which have not been heat-imaged.

---

The present invention relates to thermographic image production, and refers more particularly to thermographic materials and methods for making diazo dye images.

At present, diazo materials are exposed to ultraviolet radiation by imaging through a suitable master to destroy diazo compounds in the exposed areas. The remaining diazo compound is then coupled to form a dye. This method does not permit reproduction from originals having graphic intelligence on two sides because a right-reading image and a wrong-reading image would be superposed on the same copy. Furthermore, the original must be transparent to ultraviolet radiation.

It has now been found that these originals may be copied by means of the present invention.

Therefore, one object of the present invention is to provide thermographic materials and methods for making diazo dye images, which overcome the disadvantages of the prior art.

Another object is to provide thermographic materials and methods for making reproduction of originals.

Another object is to provide thermographic materials and methods for making transparent copies for projection and reproduction.

Another object is to provide thermographic materials and methods for copying originals which are not transparent to ultraviolet radiation.

Other objects will become apparent in the course of the following specification.

The objects of the present invention may be realized by impressing a heat image on a thermoplastic material having a layer of diazo compound and coupler intimately disposed thereto and developing the layer with ammonia to produce a positive image. A negative image may be produced by the additional step of heating the material uniformly before developing. Heat-imaging may be accomplished with a heated stylus, with a master and infrared radiation, or with other suitable means. A suitable master consists of infrared-absorbing graphics on an infrared-transparent support. Such a master may be used to make a reflex copy of one side of the master. Since the support may be visually transparent, the developed image may be used as a transparency or intermediate.

The present invention differs from thermally developable diazo materials in that the latter uses heat to induce development. Those materials may be heat-imaged and then fixed by uniform ultraviolet exposure, or imaged with ultraviolet radiation and then fixed by uniform heating.

The present material does not contain developing agent, but does comprise diazonium compound and coupler. In the present invention, the sensitizing chemicals are intimately disposed with respect to a thermoplastic layer which affects the developing rate of the diazo compound and coupler after the thermoplastic layer has been heated. Heat is impressed imagewise and preferably attains at least the glass transition temperature of the thermoplastic material. An especially suitable material was cellulose acetate. When used as a support film for the sensitizing chemicals, excellent images were produced by heat-imaging with a heated stylus or with a master and infrared radiation followed by development with moist ammonia.

Other suitable materials are polyethylene terephthalate, cellulose acetate butyrate, acrylic resin, ethyl cellulose, and urea formaldehyde resin. These may be in the form of a self-supporting film or a layer on some other support such as glass, paper, wood, metal and the like.

Conventional diazo compounds and couplers may be used in the layer as well as the conventional ancillary chemicals such as stabilizers and the like. The layer may be coated on, impregnated into, or intimately admixed with the thermoplastic material.

Some suitable diazo compounds are 4- diethylamino-benzene diazonium borofluoride; 2,5-diethoxy-4-morpholino-benzene diazonium borofluoride; 2,5-dimethoxy-4-morphino-benzene diazonium borofluoride; and 4-ethyl-benzylamino-benzene diazonium chloride. Mixtures of diazo compounds may also be used.

Suitable couplers include 2,4-dihydroxy-benzamide; 1-methyl-3-hydroxy-4-acetylamido-benzene; 3-hydroxy-2-naphthoic acid ethanolamide hydrochloride; diresorcinol sulfide; 4-bromo-3,5-dihydroxy-benzoic acid amide; resorcinol; (2-hydroxy-4-methyl)-beta-phenyl-glutaric acid; and 3-hydroxy-2-naphthoic acid ethylenediamine amide hydrochloride. Mixtures of couplers were also suitable.

The present invention is further illustrated by the following examples which are not intended to limit the scope of the inventive concept.

EXAMPLE 1

A diazo sheet comprising a cellulose acetate support bearing a layer of diazo compound and coupler was placed on a master to form a sandwich. This was exposed to infrared radiation in a thermographic machine to impress a heat image on the diazo sheet. The sensitized side of the sheet was in contact with the image side of the master for better resolution. After exposure, the sheet was separated from the master and developed conventionally in an atmosphere of moist ammonia. Quite unexpectedly, a positive image developed. This was more pronounced when the developing atmosphere was ammonia-impoverished. It was evident that the developing action of ammonia took place faster in heated areas of the sheet than in the unheated areas.

One possible explanation was that the heated areas permitted more rapid or selective absorption of moist ammonia into the diazo sensitizing layer. But the result was still unexpected since it was reasonable to assume that diazonium compound would be destroyed by heat. Even if it were not completely destroyed, the fact that diazo compound in the unheated background areas was not affected at all should have resulted in development of a negative image by difference in density. The use of more stable diazonium compounds was found to be advantageous. It is believed that the diazo sheet must be heated imagewise to at least the glass transition temperature of the thermoplastic material. It is obvious that this temperature must be lower than the decomposition temperature of the diazo compound and coupler.

Another unexpected result was the quality of continuous tone gradations provided by the present invention. This permitted very faithful reproduction of silver halide positive prints. A measure of contrast control was obtainable by varying the temperature of exposure of the diazo material.

The combination of 4-diethylamino-benzene diazonium borofluoride with 2,4-dihydroxy benzamide, 1-methyl-3-hydroxy - 4-acetylamido - benzene, 3-hydroxy-2 - naphthoic acid ethanolamide hydrochloride, and diresorcinol sulfide with cellulose acetate butyrate and acrylic resin on a polyethylene terephthalate film produced black images.

The combination of 2,5 - diethoxy - 4 - morpholinobenzene diazonium borofluoride, resorcinol, and cellulose acetate produced a sepia image by the present image. This was suitable for use as a reproduction intermediate for making conventional diazo copies.

The combination of 2,5 - dimethoxy - 4 - morpholinobenzene diazonium borofluoride, 4 - bromo-3,5-dihydroxy-benzoic acid amide, and cellulose acetate film support produced a magenta image suitable for projection as a transparency.

EXAMPLE 2

A diazo sheet comprising diazo compound and coupler on a cellulose acetate film support was exposed in a thermographic machine with a master, separated from the master, and then re-exposed several times without the master in the same machine. The structure of the diazo layer was so modified that development in moist ammonia produced a negative of the original image, that is, the background area developed more rapidly than the image area. Possibly the additional warmth succeeded in speeding up the previously slow developing background areas and rendered the previously exposed image areas too dry to develop at all.

It is apparent that the described examples are capable of many variations and modifications. All such variations and modifications are to be included within the scope of the present invention.

What is claimed is:
1. A method of making an image comprising:
  (a) providing copying material consisting essentially of a diazonium compound, an azo dye coupler capable of forming a colored dye with said diazonium compound in an alkaline environment, and a thermoplastic polymer;
  (b) imagewise heating said material to a temperature below the decomposition temperature of said diazonium compound; and
  (c) exposing said material to an atmosphere of a gaseous alkali for a time sufficient to develop said colored dye in areas defining said imagewise heating.
2. A method according to claim 1 wherein said imagewise heating is to a temperature in excess of the glass transition temperature of said thermoplastic polymer.
3. A method according to claim 1 wherein said imagewise heating is accomplished by thermographic means.
4. A method according to claim 1 wherein said gaseous alkali is moist ammonia vapor.
5. A method of making an image comprising:
  (a) providing copying material consisting essentially of a diazonium compound, an azo dye coupler capable of forming a colored dye with said diazonium compound in an alkaline environment, and a thermoplastic polymer, said material being substantially devoid of substances capable of providing alkali when heated;
  (b) imagewise heating said material to a temperature below the decomposition temperature of said diazonium compound; and
  (c) exposing said material to an atmosphere of a gaseous alkali for a time sufficient to develop said colored dye in areas defining said imagewise heating.

References Cited

UNITED STATES PATENTS

| | | | |
|---|---|---|---|
| 3,191,030 | 6/1965 | Huett et al. | 250—65 |
| 3,224,878 | 12/1965 | Klimkowski | 96—49 |

WILLIAM F. LINDQUIST, Primary Examiner

U.S. Cl. X.R.

96—49